March 25, 1969     C. R. GRAGE     3,434,362
WHEEL FOR WIRE TYPE STONE-CUTTING SAWS
Filed Jan. 15, 1968
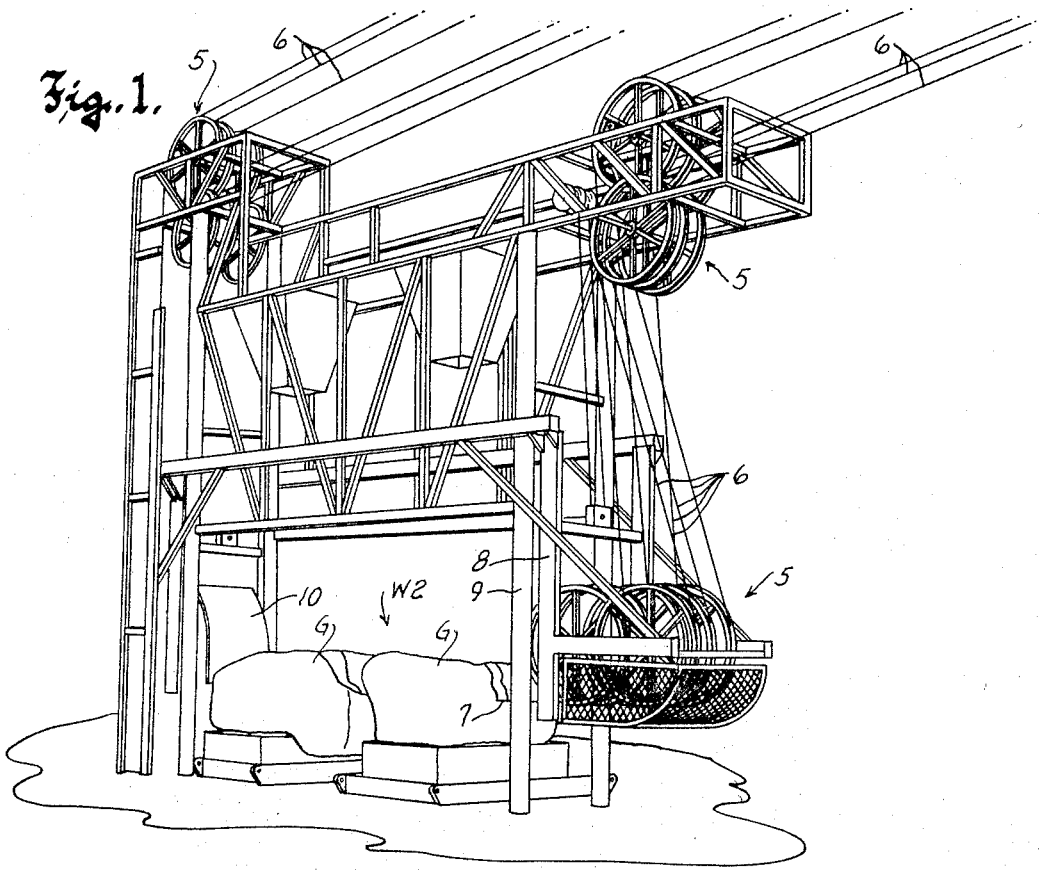
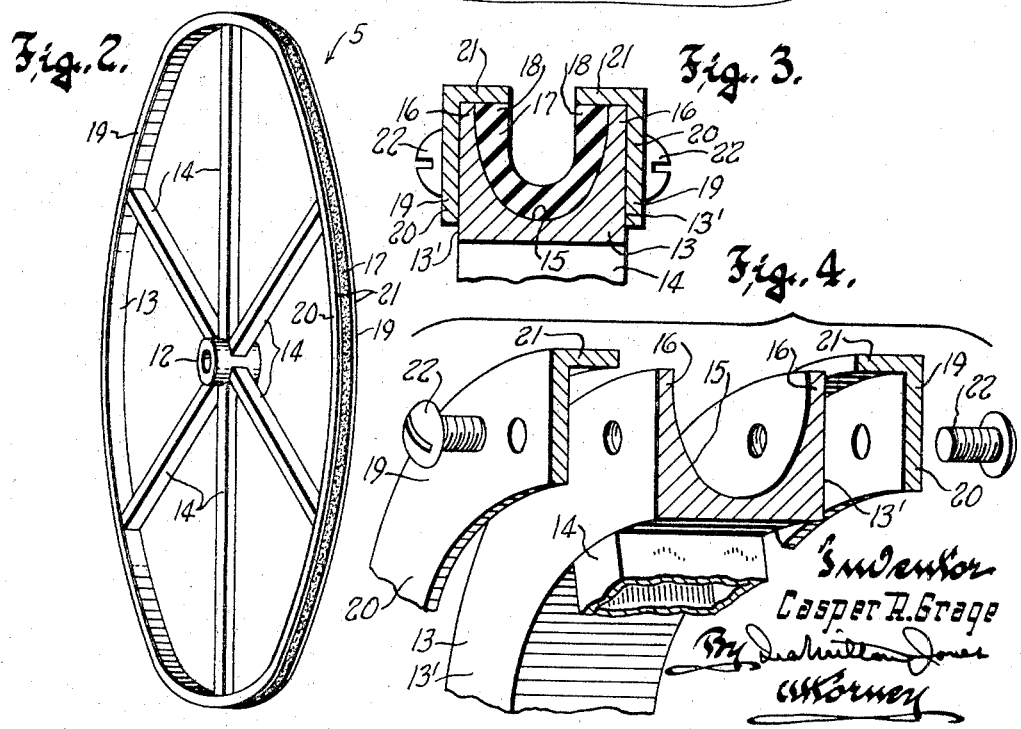
Inventor
Casper R. Grage

United States Patent Office 3,434,362
Patented Mar. 25, 1969

3,434,362
WHEEL FOR WIRE TYPE STONE-CUTTING SAWS
Casper R. Grage, Escondido, Calif., assignor to Continental Granite Corp., Escondido, Calif., a corporation of California
Filed Jan. 15, 1968, Ser. No. 697,850
Int. Cl. F16h 55/40
U.S. Cl. 74—230.7                                             3 Claims

ABSTRACT OF THE DISCLOSURE

A large diameter wire-guiding pulley or wheel with square tubular spokes and a felly that has flat sides flush with the sides of the spokes and a round bottomed groove in the center of its periphery. A rubber rim, U-shaped in cross section, lines the groove in the felly and is removably secured in place by a pair of retainer rings detachably fixed to the sides of the felly by screws. The retainer rings are L-shaped in cross section and have one flange thereof in flat engagement with the sides of the felly and the other flange snugly encircling the peripheral portions of the felly and rim.

---

This invention relates to wire-type saws used to cut large blocks of granite and other similar stone into slabs, and refers more particularly to the large diameter pulleys or wheels over which the cutting wires travel and by which they are guided to have a stretch thereof constrained to travel linearly along horizontal paths across a work zone, and to descend onto and through a block of stone in position to be cut.

An essential part of the pulleys or wheels of wire-type saws is a rubber rim on the felly of the wheel. This rim has a cross sectional shape which provides an annular outwardly opening groove in which the cutting wire rides as it passes over the wheel or pulley.

Heretofore, the wheels or pulleys of wire-type saws used in the stone industry had a relatively short useful life because of the manner in which their rubber rims were mounted. These rims must be replaced at intervals varying from one week to two months, depending upon the amount of time they are in use and the nature of the stone being cut. Despite this need for frequent replacement of the rubber rims, the fellys of the pulleys or wheels had integral inwardly directed lips or flanges that engaged over the side edge portions of the rim and held the rim to the felly.

In the cutting of stone, and particularly granite, the wire guiding pulleys or wheels are subjected to highly corrosive conditions caused by chemical reaction from the silicon carbide and water employed in the cutting operation. Accordingly, it was not long before the lips or flanges of the felly by which the rubber rim was held in place, were corroded to such an extent that they had to be repaired or rebuilt by welding, or the entire wheel had to be discarded and replaced with a new one. Obviously, this was poor economy.

Another disadvantage of the pulleys or wheels of wire type saws as they were previously constructed, was the danger of having the rubber rims thrown off by centrifugal force because the retaining lips or flanges had become corroded and no longer capable of holding the rims in place.

With a view toward overcoming these objections to the heretofore available pulleys or wheels for wire type saws, it is an object of this invention to provide an improved wheel for this purpose, in which the retainer for the rubber rim as well as the rim, is readily replaceable; so that in the event the retainer is no longer capable of reliably holding the rim in place, it can be easily and inexpensively replaced, thereby avoiding the expense of a new wheel.

Another object of this invention is to provide a pulley or wheel for wire type stone-cutting saws wherein the rubber rim is readily removably held in place by a pair of retainer rings which are formed of material far more resistant to the corrosive effects to which such wheels are subjected than the cold rolled steel of which the wheels per se are made.

With these observations and objects in mind, the manner in which the invention achieves its purpose will be appreciated from the following description and the accompanying drawing. This disclosure is intended merely to exemplify the invention. The invention is not limited to the particular structure disclosed, and changes can be made therein which lie within the scope of the appended claims without departing from the invention.

The drawing illustrates one complete example of the physical embodiment of the invention constructed according to the best mode so far devised for the practical application of the principles thereof, and in which:

FIGURE 1 is a perspective view of a portion of a wire type stone-cutting saw illustrating the environment in which some of the pulleys or wheels of this invention are employed;

FIGURE 2 is a perspective view of a pulley or wheel embodying this invention;

FIGURE 3 is a cross sectional view on an enlarged scale, through the felly of the wheel; and FIGURE 4 is an exploded perspective cross sectional view, also at an enlarged scale, through the felly of the wheel and the retainer rings by which the rubber rim—which is not shown in this view—is removably held in place.

Referring now to the drawing, the numeral 5 designates generally a pulley or wheel (hereinafter simply called a wheel) embodying this invention. As shown in FIGURE 1, a number of such wheels are employed in a wire type stone-cutting saw, to guide the cutting wires 6 for linear travel with a stretch thereof—designated by the numeral 7—extending horizontally across a work zone W2. This stretch of the wires is defined by two groups of wheels that are carried by a frame 8 mounted for vertical movement in the stationary structure 9 of the machine. Only one of these two groups of wheels is visible, the other being hidden behind a guard 10. Suitable means are provided to raise and lower the frame 8 so that the work to be cut—for instance, blocks of granite G—may be placed in position in the work zone beneath the stretches 7. As the frame descends during operation of the machine, the wire stretches 7 cut through the work by their frictional engagement therewith in the presence of a suitable cutting agent—usually pulverized silicon carbide and water.

The wires are kept taut by sets of wheels (not shown) located far to the right of FIGURE 1, and as will be appreciated, certain of the wheels are power driven to impart the necessary linear movement to the wires.

Each wheel 5 comprises a hub 12, a felly 13 and a plurality of spokes 14 connecting the hub and felly. These parts, all preferably made of cold rolled steel, are welded together. The spokes are formed of square tubing of a size corresponding to the width of the felly so that the sides of the felly are flush with the sides of the spokes. This assures against accumulation of residue at the sides of the spokes.

The most important part of the improved wheel resides in its felly. As already indicated, the felly is made of cold rolled steel and preferably is a length of rectangular bar stock formed or rolled into a ring. It has flat parallel sides 13' and an annular groove 15 opening to its periphery. This groove is semi-eliptical in cross sectional shape and, in effect, divides the felly into spaced symmetrically disposed side walls 16.

Seated in the groove 15 is a rim 17 or rubber or rubber-like material. The rim has a U-shaped cross section of a size to have snug engagement with the surface of the groove in the felly. In effect, the rim forms a liner for the groove, and in use the wire of the saw rides in the rim, which because of its U-shaped cross section, forms an annular outwardly opening groove between spaced flanges 18. The peripheries of the flanges 18 and of the side walls 16 of the felly are cylindrical and flush with one another.

The rubber rim is removably held in place by a pair of retainer rings 19 that are detachably secured to the felly. These rings are identical and are made of extruded aluminum of angle cross section. Hence the rings have a flat flange 20 and a cylindrical flange 21, the latter having an inside diameter to snugly fit the outer diameter of the felly and a width equal to the combined widths of the peripheries of the adjacent rim flange and felly side wall. Thus, with the retainer rings in place flatwise engaging the sides of the felly, in which positions they are detachably held by screws 22, the rubber rim is tightly held to the felly and its peripheral portions are protected from damage by the wire, since the retainer rings serve to guide the wire into the groove in the rim.

If desired, the rim may be cemented to the surfaces of the groove in the felly, and preferably the rim is simply a strip of rubber of the proper cross sectional shape, equal in length to the circumference of the felly.

By virtue of the quick and easy detachability of the retainer rings, replacement of a worn rim is a simple matter; and, being made of aluminum, the rings are quite resistant to the corrosive effects of silicon carbide, pulverized granite and water, so that they seldom need replacement. However, if such replacement is necessary, it involves far less expense than replacement of the entire wheel, as had to be done in the past.

From the foregoing description taken with the drawing, it will be clear to those skilled in the art that this invention effects a substantial improvement in wire type stone-cutting machines.

What is claimed as my invention is:

1. A wheel for wire type saws used in cutting stone, having a hub, a felly and spokes connecting the hub and felly, characterized in that:
   (a) in cross section the felly is substantially U-shaped with a pair of spaced apart side walls and an annular radially outwardly opening groove therebetween;
   (b) a rim of rubber-like material seated in said groove, said rim having an annular radially outwardly opening wire receiving groove between axially spaced flanges, the peripheries of which are flush with the peripheries of the side walls of the felly;
   (c) a rim securing retainer ring snugly encircling each of the side walls on the felly and extending axially inwardly over the adjacent flange of the rim; and
   (d) fastening means detachably holding said retainer rings to the felly,
       whereby upon detachment of said rings, a worn rim may be removed and replace with a new one.

2. The wheel of claim 1, wherein said fastening means comprises a radially inwardly directed annular flange on each ring in surface-to-surface engagement with the outer face of the adjacent side wall of the felly,
   and screws passing through said inwardly directed flanges and threaded into the felly.

3. The wheel of claim 1, wherein the peripheries of the side walls of the felly and the peripheries of the flanges of the rim are cylindrical and have the same diameter,
   and wherein the axially inner edges of said retainer rings and of the rim flanges are coterminous,
       so that the retainer rings protect the flanges of the rim and serve to guide a wire into the annular groove of the rim when the wheel is in use.

References Cited

UNITED STATES PATENTS

| | | |
|---|---|---|
| 382,042 | 5/1888 | King. |
| 449,676 | 4/1891 | Hall. |
| 2,970,867 | 2/1961 | Ruf. |
| 2,986,136 | 5/1961 | Wayland _____ 74—230.01 XR |
| 3,279,762 | 10/1966 | Bruns _____ 74—230.7 XR |
| 3,327,964 | 6/1967 | Nussbaumer. |

FOREIGN PATENTS

| | | |
|---|---|---|
| 1,142,761 | 4/1957 | France. |

FRED C. MATTERN, Jr., *Primary Examiner.*

J. A. WONG, *Assistant Examiner.*